US012669648B2

(12) United States Patent
Wang et al.

(10) Patent No.: US 12,669,648 B2
(45) Date of Patent: Jun. 30, 2026

(54) PHOTONIC PACKAGE AND METHOD FOR FORMING THE SAME

(71) Applicant: Taiwan Semiconductor Manufacturing Company, Ltd., Hsinchu (TW)

(72) Inventors: Wei-Ming Wang, Taichung City (TW); Chen Chen, New Taipei City (TW); Chih-Hao Yu, Tainan City (TW); Shih-Peng Tai, Xinpu Township, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 367 days.

(21) Appl. No.: 18/343,388

(22) Filed: Jun. 28, 2023

(65) Prior Publication Data

US 2025/0004202 A1 Jan. 2, 2025

(51) Int. Cl.
*G02B 6/13* (2006.01)
*G02B 6/136* (2006.01)
*G02B 6/42* (2006.01)
*G02B 6/12* (2006.01)

(52) U.S. Cl.
CPC .............. *G02B 6/13* (2013.01); *G02B 6/136* (2013.01); *G02B 6/4204* (2013.01); *G02B 2006/12102* (2013.01)

(58) Field of Classification Search
CPC ......... G02B 6/13; G02B 6/136; G02B 6/4204
See application file for complete search history.

(56) References Cited

U.S. PATENT DOCUMENTS

| | | | | | |
|---|---|---|---|---|---|
| 6,059,188 | A | * | 5/2000 | diFazio | .............. G06K 7/10742 235/462.36 |
| 2009/0283311 | A1 | * | 11/2009 | Ida | ........................ H01L 23/481 29/846 |
| 2019/0243064 | A1 | * | 8/2019 | Menezo | ................. G02B 6/136 |
| 2022/0382004 | A1 | * | 12/2022 | Weng | ................. G02B 6/12004 |
| 2022/0392873 | A1 | * | 12/2022 | Lin | ........................ H01L 21/486 |

FOREIGN PATENT DOCUMENTS

| | | | | |
|---|---|---|---|---|
| TW | | 200847418 A | 12/2008 | |
| TW | | 200903746 A | 1/2009 | |
| TW | | 202036809 A | 10/2020 | |
| TW | | 202322303 A | 6/2023 | |
| WO | WO-2022232665 A1 | * | 11/2022 | ............. H01L 24/80 |

* cited by examiner

*Primary Examiner* — Charlie Y Peng

(74) *Attorney, Agent, or Firm* — Birch, Stewart, Kolasch & Birch, LLP

(57) ABSTRACT

A method of forming a semiconductor package is provided. The method includes forming a first wafer that includes multiple photonic dies. The method includes forming a second wafer that includes multiple electronic dies. The method includes forming micro lenses within the second wafer. The method includes bonding the first wafer to the second wafer after forming the plurality of micro lenses. The method further includes performing a singulation process to dice the first wafer and the second wafer to form multiple photonic packages, wherein one of the photonic packages includes an electronic die, a photonic die bonded to the electronic die, and one or more micro lenses embedded in the electronic die.

20 Claims, 17 Drawing Sheets

700

PHOTONIC PACKAGE AND METHOD FOR FORMING THE SAME

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as for processing and controlling. Accordingly, devices that integrate optical components and electrical components are produced for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
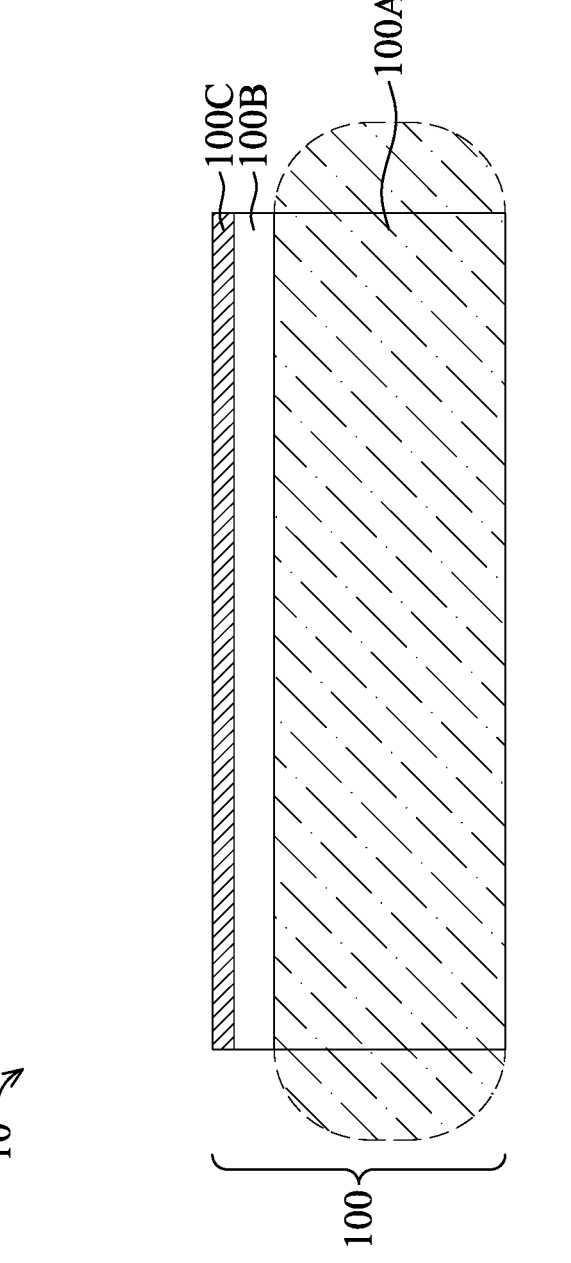
FIGS. 1 to 12 illustrate cross-sectional views of intermediate stages in the formation of a photonic package, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

A photonic package and the method for forming the same are provided in accordance with some embodiments of the present disclosure. In some embodiments, photonic packages are formed by forming a "photonic integrated circuit (PIC)" wafer comprising multiple one or more photonic dies, forming an "electronic integrated circuit (EIC)" wafer comprising one or more electronic dies that have one or more embedded micro lenses, bonding the PIC wafer to the EIC wafer to form a wafer-on-wafer (WoW) bonded structure, and then performing a singulation process to separate multiple photonic packages within the bonded structure into individual photonic packages, each photonic package including a photonic die bonded to an electronic die, with one or more micro lenses embedded in the electronic die. In some cases, micro lenses can be formed directly within the EIC wafer at various stages of forming the EIC wafer. In this manner, photonic packages can be formed in only one-step bonding process, eliminating the need for an additional bonding process (e.g., chip-on-wafer (CoW) bonding process that requires more manufacturing steps, which may cause processes issues). Accordingly, the process flow is simplified, manufacturing time and cost are reduced, and product reliability can be improved.

The Embodiments discussed herein provide examples to enable making or using the subject matter of this disclosure, and a person having ordinary skill in the art will readily understand that modifications can be made while remaining within the contemplated scope of different embodiments. Throughout the various views and illustrative embodiments, like reference numbers are used to designate like elements. Although method embodiments may be discussed as being performed in a particular order, other method embodiments may be performed in any logical order.

FIGS. 1 to 12 illustrate cross-sectional views of intermediate stages in the formation of a photonic package 10, in accordance with some embodiments. In some cases, the photonic package 10 may be part of a semiconductor package or another structure. In some embodiments, the photonic package 10 provides an input/output (I/O) interface between optical signals and electrical signals in a semiconductor package. In some embodiments, the photonic package 10 provides an optical network for signal communication between components (e.g., photonic components, integrated circuits, couplings to external fibers, etc.) within the photonic package 10. In some cases, the photonic package 10 may be considered an "optical engine."

Referring to FIG. 1, a buried oxide ("BOX") substrate 100 is provided, in accordance with some embodiments. The BOX substrate 100 includes an oxide layer 100B formed over a substrate 100A, and a silicon layer 100C formed over the oxide layer 100B. The substrate 100A may be a material such as a glass, ceramic, dielectric, a semiconductor, the like, or a combination thereof. In some embodiments, the substrate 100A is a semiconductor substrate, such as a bulk semiconductor or the like, which may be doped or undoped. The substrate 100A may be a wafer, such as a silicon wafer. The wafer may include an edge portion (shown in dashed line). When viewed from top, the edge portion of the substrate/wafer 100A formed a fully ring. In other embodiments, other substrates, such as a multi-layered or gradient substrate may also be used.

In some embodiments, the semiconductor material of the substrate 100A may include silicon; germanium; a compound semiconductor including silicon carbide, gallium arsenic, gallium phosphide, indium phosphide, indium arsenide, and/or indium antimonide; an alloy semiconductor including silicon germanium, gallium arsenide phosphide, aluminum indium arsenide, aluminum gallium arsenide, gallium indium arsenide, gallium indium phosphide, and/or gallium indium arsenide phosphide; or a combination thereof. The oxide layer 100B may be formed of or comprise, for example, a silicon oxide or the like. The BOX substrate 100 may be referred to as having a front side (e.g., the side facing upwards in FIG. 1) and a back-side (e.g., the side facing downwards in FIG. 1).

Figure 2:
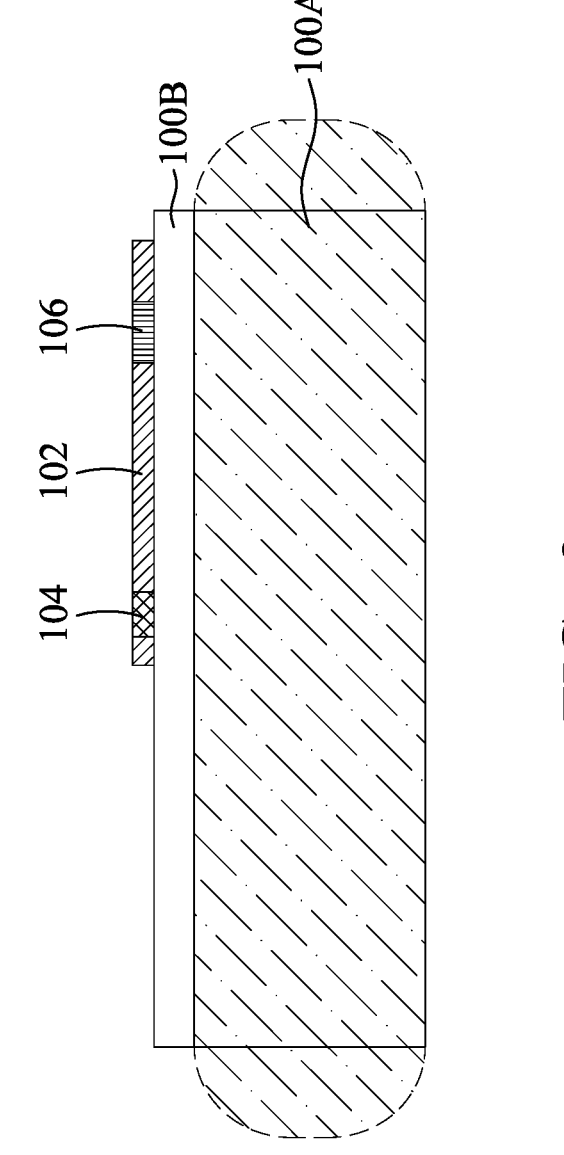

In FIG. 2, the silicon layer 100C is patterned to form silicon regions for waveguides 102, photonic components 104, and grating couplers 106, in accordance with some embodiments. In this manner, the silicon layer 100C may be considered an "optical layer" in some cases. The silicon layer 100C may be patterned using suitable photolithography and etching techniques. For example, a hard mask layer (e.g., a nitride layer or the like, not shown) may be formed over the silicon layer 100C and patterned, in some embodiments. The pattern of the hard mask layer may then be transferred to the silicon layer 100C using an etching process. The etching process may include a dry etching process and/or a wet etching process, which may include an anisotropic process. For example, the silicon layer 100C may be etched to form recesses defining the waveguides 102 (also referred to as silicon waveguides 102), with sidewalls of the remaining unrecessed portions defining sidewalls of the waveguides 102. In some embodiments, more than one photolithography and etching process may be used in order to pattern the silicon layer 100C.

One waveguide 102 or multiple waveguides 102 may be patterned from the silicon layer 100C. If multiple waveguides 102 are formed, the multiple waveguides 102 may be separate individual waveguides 102 or they may be connected into a single continuous structure. In some embodiments, one or more of the waveguides 102 form a continuous loop. Other configurations or arrangements of waveguides 102, the photonic components 104, or the grating couplers 106 are also possible, and are not limited to those shown in FIG. 2. In some cases, the waveguides 102, the photonic components 104, and the grating couplers 106 may be collectively referred to as a "photonic layer" or as a "photonic integrated circuit (PIC)."

The photonic components 104 may be integrated with the waveguides 102, and may be formed with the waveguides 102. The photonic components 104 may be optically coupled to the waveguides 102 and may interact with optical signals within the waveguides 102. The photonic components 104 may include photonic devices such as photodetectors, modulators, other photonic devices, or the like. For example, a photodetector may be optically coupled to the waveguides 102 to detect optical signals within the waveguides 102 and generate electrical signals corresponding to the optical signals. As another example, a modulator may be optically coupled to the waveguides 102 to receive electrical signals and generate corresponding optical signals within the waveguides 102 by modulating optical power within the waveguides 102. In this manner, the photonic components 104 can facilitate the input/output (I/O) of optical signals to and from the waveguides 102. In other embodiments, the photonic components 104 may include other active or passive components, such as laser diodes, optical signal splitters, phase shifters, interferometers, oscillators, or other types of photonic structures or devices.

In some embodiments, photodetectors may be formed by partially etching regions of the waveguides 102 and growing epitaxial material on the remaining silicon of the etched regions. The waveguides 102 may be etched using acceptable photolithography and etching techniques. The epitaxial material may comprise a semiconductor material such as germanium, which may be doped or undoped. In some embodiments, an implantation process may be performed to introduce dopants within the silicon of the etched regions as part of the formation of the photodetectors. The silicon of the etched regions may be doped with p-type dopants, n-type dopants, or a combination. In some embodiments, modulators may be formed by partially etching regions of the waveguides 102 and then implanting appropriate dopants into the remaining silicon of the etched regions. The waveguides 102 may be etched using acceptable photolithography and etching techniques. In some embodiments, the etched regions used for the photodetectors and the etched regions used for the modulators may be formed using one or more of the same photolithography or etching steps. The silicon of the etched regions may be doped with p-type dopants, n-type dopants, or a combination thereof. In some embodiments, the etched regions used for the photodetectors and the etched regions used for the modulators may be implanted using one or more of the same implantation steps.

In some embodiments, one or more grating couplers 106 may be formed with the waveguides 102. The grating couplers 106 are photonic structures that allow optical signals and/or optical power to be transferred between the waveguides 102 and another photonic component, such as a vertically-mounted optical fiber (e.g., optical fiber 316 shown in FIG. 12) or a waveguide of another photonic system. The grating couplers 106 may be formed using acceptable photolithography and etching techniques. In some embodiments, the grating couplers 106 are formed after the waveguides 102 are defined. For example, a photoresist layer may be formed on the waveguides 102 and patterned, with the pattern of the photoresist layer corresponding to the grating couplers 106. One or more etching processes may then be performed on the waveguides 102 using the patterned photoresist layer as an etching mask to form the grating couplers 106. The etching processes may include one or more dry etching processes and/or wet etching processes, which may include anisotropic processes.

Figure 10:
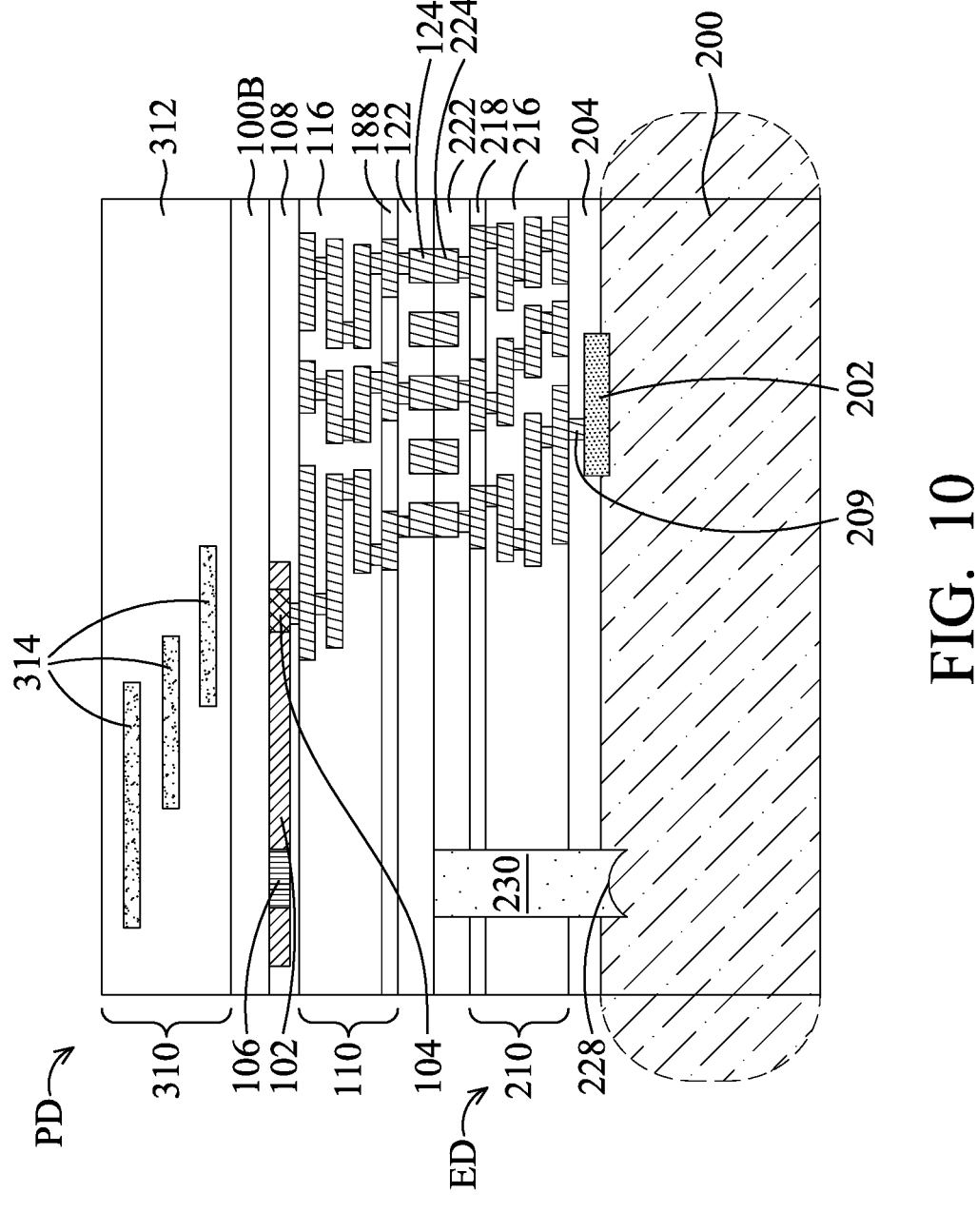

In some embodiments, other types of couplers (not shown for simplicity) may be formed, such as a structure that couples optical signals between the waveguides 102 and other waveguides of the photonic package 10 (e.g., the nitride waveguides 314 shown in FIG. 10). Edge couplers (not shown for simplicity) may also be formed that allow optical signals and/or optical power to be transferred between the waveguide 102 and a photonic component (not shown in the figures) that is horizontally mounted to a sidewall of the photonic package 10. These and other photonic structures are considered within the scope of the present disclosure.

Figure 3:
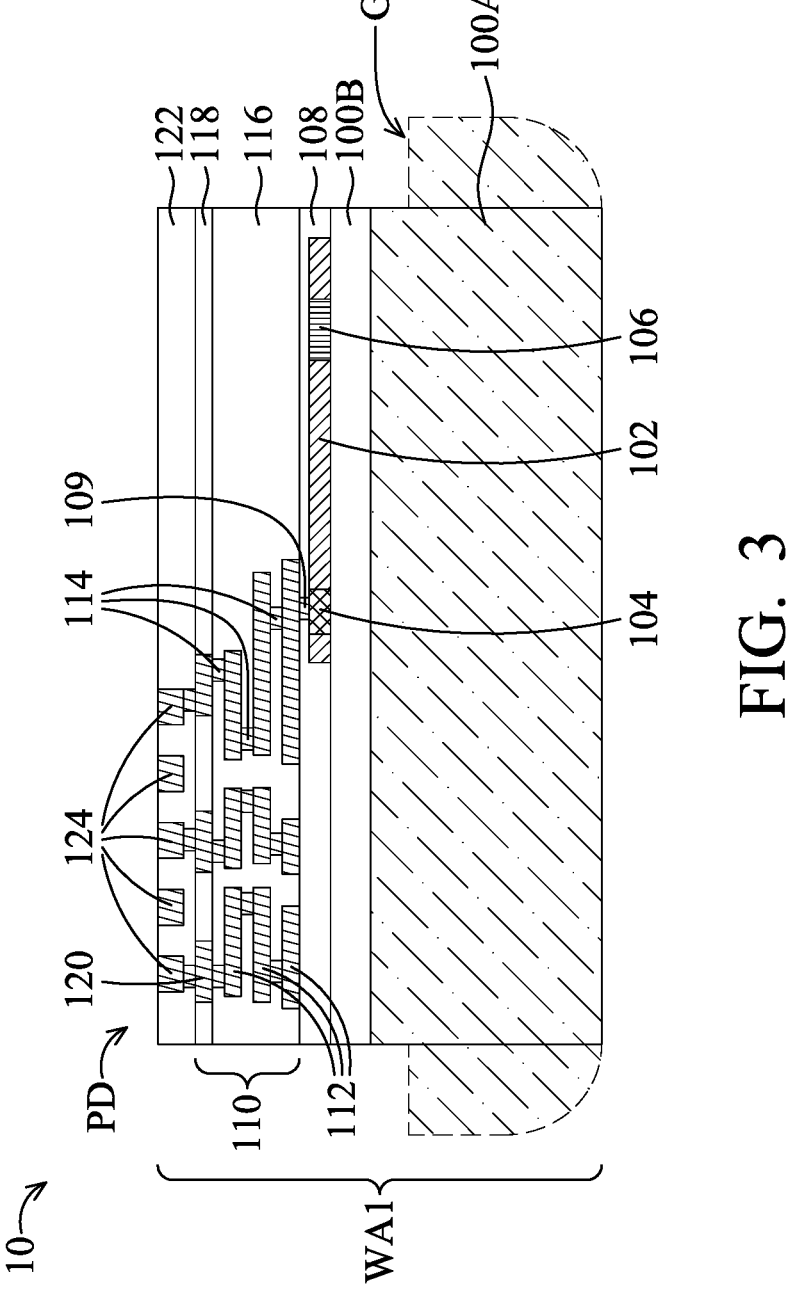

In FIG. 3, a dielectric layer 108 is formed on the front side of the BOX substrate 100, in accordance with some embodiments. The dielectric layer 108 is formed over the waveguides 102, the photonic components 104, the grating couplers 106, and the oxide layer 100B. The dielectric layer 108 may be formed of or comprise, for example, silicon oxide, silicon nitride, the like, or a combination thereof, and may be formed by any acceptable deposition process, such as spin coating, chemical vapor deposition (CVD), physical vapor deposition (PVD), atomic layer deposition (ALD), laminating, the like, or a combination thereof. Other dielectric materials formed by any acceptable process may be used. In some embodiments, the dielectric layer 108 is then planarized and thinned using a planarization process such as a chemical-mechanical polish (CMP) process, a grinding process, or the like. A thinner dielectric layer 108 may allow for more efficient optical coupling between a grating coupler 106 and a vertically-mounted photonic component, or more efficient optical coupling between the waveguides 102 and overlying waveguides, such as the nitride waveguides 314 described below (see FIG. 10).

Due to the difference in refractive indices of the materials of the waveguides 102 and dielectric layer 108, the waveguides 102 have high internal reflections such that light is substantially confined within the waveguides 102, depending on the wavelength of the light and the refractive indices of the respective materials. In some embodiments, the refractive index of the material of the waveguides 102 is higher than the refractive index of the material of the dielectric layer 108. For example, the waveguides 102 may comprise silicon, and the dielectric layer 108 may comprise silicon oxide and/or silicon nitride. Accordingly, the waveguides 102 may be referred to as "silicon waveguides" herein.

Contacts 109 are formed in the dielectric layer 108, and are used to electrically connect the photonic components 104 to overlying conductive features (e.g., metal lines 112 and vias 114), in accordance with some embodiments. The contacts 109 allow electrical power or electrical signals to be transmitted to the photonic components 104 and electrical signals to be transmitted from the photonic components 104. In this manner, the photonic components 104 may convert electrical signals into optical signals transmitted by the waveguides 102, and/or may convert optical signals from the waveguides 102 into electrical signals. In some embodiments, the contacts 109 are formed by a damascene process, e.g., single damascene, dual damascene, or the like. For example, openings (not shown) for the contacts 109 are first formed in the dielectric layer 108 using acceptable photolithography and etching techniques. A conductive material may then be formed in the openings, forming the contacts 109. Excess conductive material may be removed using a CMP process or the like. The conductive material of the contacts 109 may be formed of a metal or a metal alloy including aluminum, copper, tungsten, or the like. The contacts 109 may be formed using other techniques or materials in other embodiments.

A redistribution structure 110 is then formed over the dielectric layer 108 and contacts 109, in accordance with some embodiments. The redistribution structure 110 is an interconnect structure that includes one or more dielectric layers (collectively shown and referred to as "dielectric layers 116") and includes conductive features (e.g., metal lines 112 and vias 114) formed in the dielectric layers 116 that provide interconnections and electrical routing. The dielectric layers 116 may comprise one or more materials similar to those described above for the dielectric layer 108, such as a silicon oxide or a silicon nitride, or may comprise a different material. The dielectric layers 116 and/or the dielectric layer 108 may be transparent or nearly transparent to light within the same range of wavelengths. The dielectric layers 116 may be formed using a technique similar to those described above for the dielectric layer 108 or using a different technique.

Metal lines 112 and vias 114 (hereinafter collectively referred to as "conductive features 112/114") are formed in the dielectric layers 116. The metal lines 112 at the same level are collectively referred to as a metal layer hereinafter. In some embodiments, the interconnect structure 110 includes a plurality of metal layers that are interconnected through vias 114. The conductive features 112/114 may be formed by a damascene process, e.g., single damascene, duel damascene, or the like. For example, the conductive features 112/114 may be formed, for example, by depositing a dielectric layer 116 and then forming openings extending through the dielectric layer 116 using acceptable photolithography and etching techniques. A conductive material may then be formed in the openings, thereby forming the conductive features 112/114 in the dielectric layer 116. A planarization process (e.g., a CMP process or the like) may be performed to remove excess conductive material along the top surface of the dielectric layer 116, such that top surfaces of the conductive features 112/114 and the dielectric layer 116 are level. Another dielectric layer 116 may be deposited over the conductive features 112/114, and a similar process may be performed to form additional conductive features 112/114. In this manner, the process may be repeated to form multiple layers of dielectric layers 116 and conductive features 112/114. The conductive features 112/114 may be formed using other techniques or materials in other embodiments.

The redistribution structure 110 may further include a passivation layer 118 over the dielectric layers 116, in accordance with some embodiments. For example, there may be an undoped silicate-glass (USG) layer, a tetraethoxysilane (TEOS) oxide layer, a silicon oxide layer, a silicon nitride layer, etc., over the dielectric layers 116. The passivation layer 118 is denser than the dielectric layers 116, and has the function of isolating the dielectric layers 116 from detrimental chemicals and gases such as moisture in external environment. In some embodiments, there may be metal pads 120 formed over the dielectric layers 116 and electrically connected to the photonic components 104 through the metal lines 112 and vias 114. The metal pads 120 are formed in the passivation layer 118. The metal pads 120 may be formed of or comprise, for example, copper, nickel, titanium, palladium, the like, or alloys thereof, and may be formed using a technique similar to those described above for the conductive features 112/114 or using a different technique.

Still referring to FIG. 3, a bond layer 122 is deposited over the redistribution structure 110, in accordance with some embodiments. The bond layer 122 may be formed of or comprise, for example, a silicon-based dielectric material, such as silicon oxide ($SiO_2$), SiN, SiON, SiOCN, SiC, SiCN, the like, or a combination thereof, and may be formed using high-density plasma chemical vapor deposition (HDPCVD), plasma enhanced chemical vapor deposition (PECVD), CVD, low-pressure chemical vapor deposition (LPCVD), ALD, or the like. In some embodiments, bond pads 124 are formed in the bond layer 122, with the top surfaces of the bond pads 124 being coplanar with the top surface of bond layer 122. In some embodiments, the bond pads 124 may comprise copper, and may be formed through damascene processes. The bond pads 124 may be formed using other techniques or materials in other embodiments.

It should be understood that the resulting structure shown in FIG. 3 is in the form of a wafer (i.e., not yet singulated), hence also referred to as a "PIC wafer WA1", which includes a plurality of photonic dies PD therein (only one photonic die PD is shown). The features described above may be parts of the same photonic die PD among a plurality of identical photonic dies. The bond layer 122 is the top surface layer of the PIC wafer WA1, which facilitates bonding of the PIC wafer WA1 to another wafer through hybrid bonding (described below).

In some embodiments, an edge trimming process is performed to trim the edge portion of the substrate (i.e., wafer) 100A of the resulting structure shown in FIG. 3, to form a groove G, which is a groove ring. The edge trimming process is performed through an etching process, which may be a plasma etching process. Other suitable edge trimming processes may be used in different embodiments, such as an mechanical trimming process.

Figure 4:
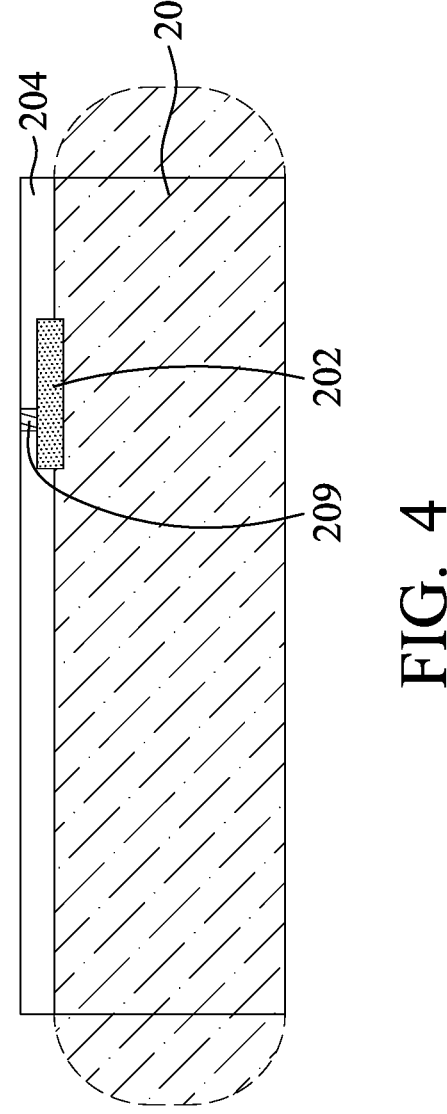

In FIG. 4, a substrate 200 is provided, in accordance with some embodiments. The substrate 200 may be formed of or comprise a material transparent to relevant wavelengths of light such that optical signals may be transmitted through the substrate 200. In some embodiments, the substrate 200 is a semiconductor substrate, such as a bulk semiconductor or the like, which may be doped or undoped. The substrate 200 may be a wafer, such as a silicon wafer. In other embodiments, other substrates, such as a multi-layered or gradient substrate may also be used.

Electronic components 202 are formed on the top surface of the substrate 200, in accordance with some embodiments. The electronic components 202 may include any suitable electronic devices such as complementary metal-oxide semiconductor (CMOS) transistors, resistors, capacitors, diodes, and/or the like. The details of electronic components 202 are not illustrated herein. The electronic components 202 may be interconnected by an interconnect structure (e.g., redistribution structure 210, shown in FIG. 5) to form an integrated circuit (also referred to as an "electronic integrated circuit (EIC)").

A dielectric layer 204 is formed over the substrate 200 and fills the space between the gate stacks of transistors (not shown) in the EICs, in accordance with some embodiments. The dielectric layer 204 may be formed using techniques and materials similar to those described above for the dielectric layer 108 or using different techniques and materials. Contacts 209 are formed in the dielectric layer 204 for electrically connect electronic components 202 to overlying conductive features (e.g., metal lines 212 and vias 214), in accordance with some embodiments. The contacts 209 may be formed using techniques and materials similar to those described above for the contacts 109 or using different techniques and materials.

Figure 5:
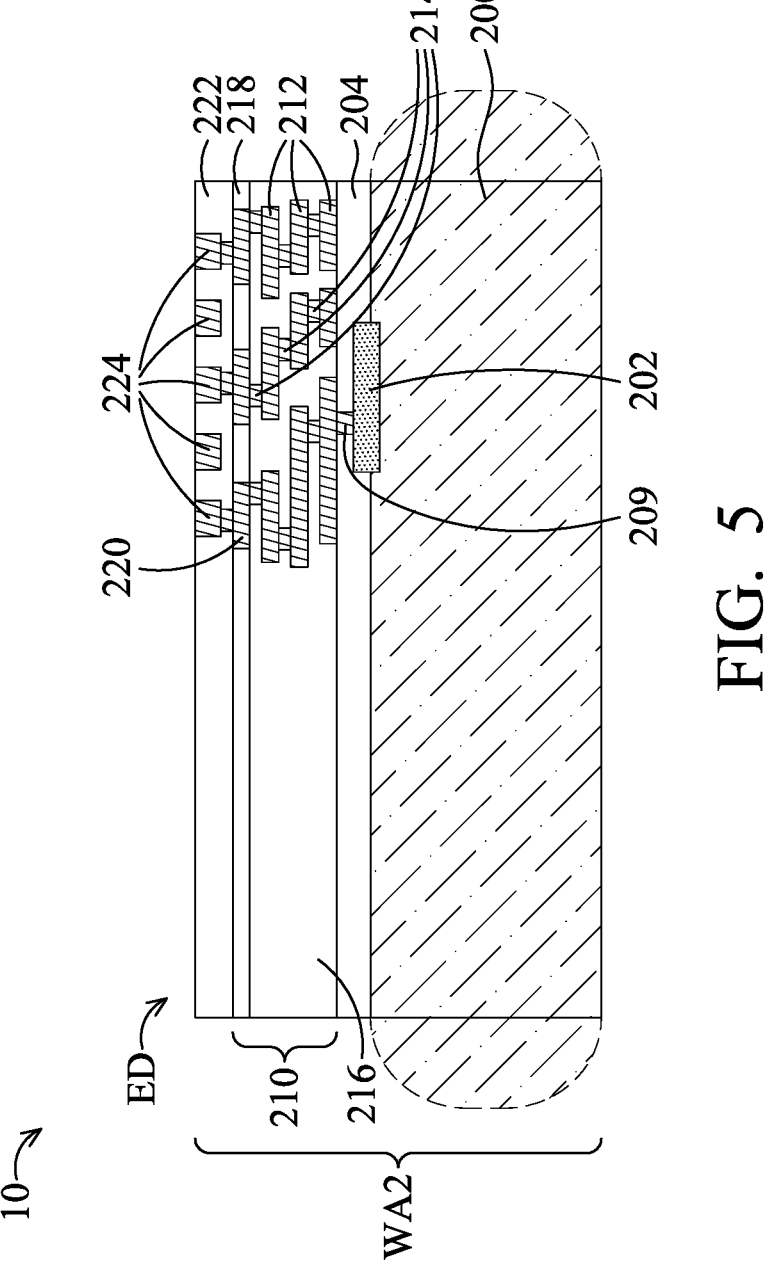

In FIG. 5, a redistribution structure 210 is then formed over the dielectric layer 204 and contacts 209, in accordance with some embodiments. Similar to the redistribution structure 110 discussed above, the redistribution structure 210 is an interconnect structure that includes one or more dielectric layers (collectively shown and referred to as "dielectric layers 216") and includes conductive features (e.g., metal lines 212 and vias 214) formed in the dielectric layers 216 that provide interconnections and electrical routing. Also, a passivation layer 218 is formed over the dielectric layers 216, and metal pads 220 are formed in the passivation layer 218 and electrically connected to the electronic components 202 through the metal lines 212 and vias 214, in accordance with some embodiments. The configuration, material and formation method of the redistribution structure 210 may be the same as or similar to those of the redistribution structure 110, and are not repeated here.

Still referring to FIG. 5, a bond layer 222 is deposited over the redistribution structure 210, in accordance with some embodiments. The bond layer 222 may be formed of a material selected from the same group of candidate materials for forming the bond layer 122. For example, the bond layer 222 may be formed of or comprise a silicon-based dielectric material, such as silicon oxide ($SiO_2$), SiN, SiON, SiOCN, SiC, SiCN, the like, or a combination thereof. The material of bond layers 122 and 222 may be the same as each other or different from each other. Bond pads 224 may be formed in the bond layer 222, with the top surfaces of the bond pads 224 being coplanar with the top surface of bond layer 222, in some embodiments. The bond pads 224 may be formed of the same or different material as the bond pads 124. The bond layer 222 and bond pads 224 may be formed using techniques similar to those described above for the bond layer 122 and bond pads 124 or using different techniques.

Similarly, it should be understood that the resulting structure shown in FIG. 5 is in the form of a wafer (i.e., not yet singulated), hence also referred to as an "EIC wafer WA2", which includes a plurality of electronic dies ED therein (only one electronic die ED is shown). The features described above may be parts of the same electronic die ED among a plurality of identical electronic dies. The bond layer 222 is the top surface layer of the EIC wafer WA2, which facilitates bonding of the EIC wafer WA2 to the PIC wafer WA1 through hybrid bonding (described below).

The electronic die ED may be, for example, a semiconductor device, die, or chip that can communicate with the photonic die PD using electrical signals. In the illustrated embodiments, the electronic die ED does not receive, transmit, or process optical signals. In the discussion herein, the term "electronic die" is used to distinguish from "photonic die", which refers to a die that can receive, transmit, or process optical signals, such as converting an optical signal into an electric signal, or vice versa. Besides optical signals, the photonic die PD may also transmit, receive, or process electrical signals.

Figure 12:
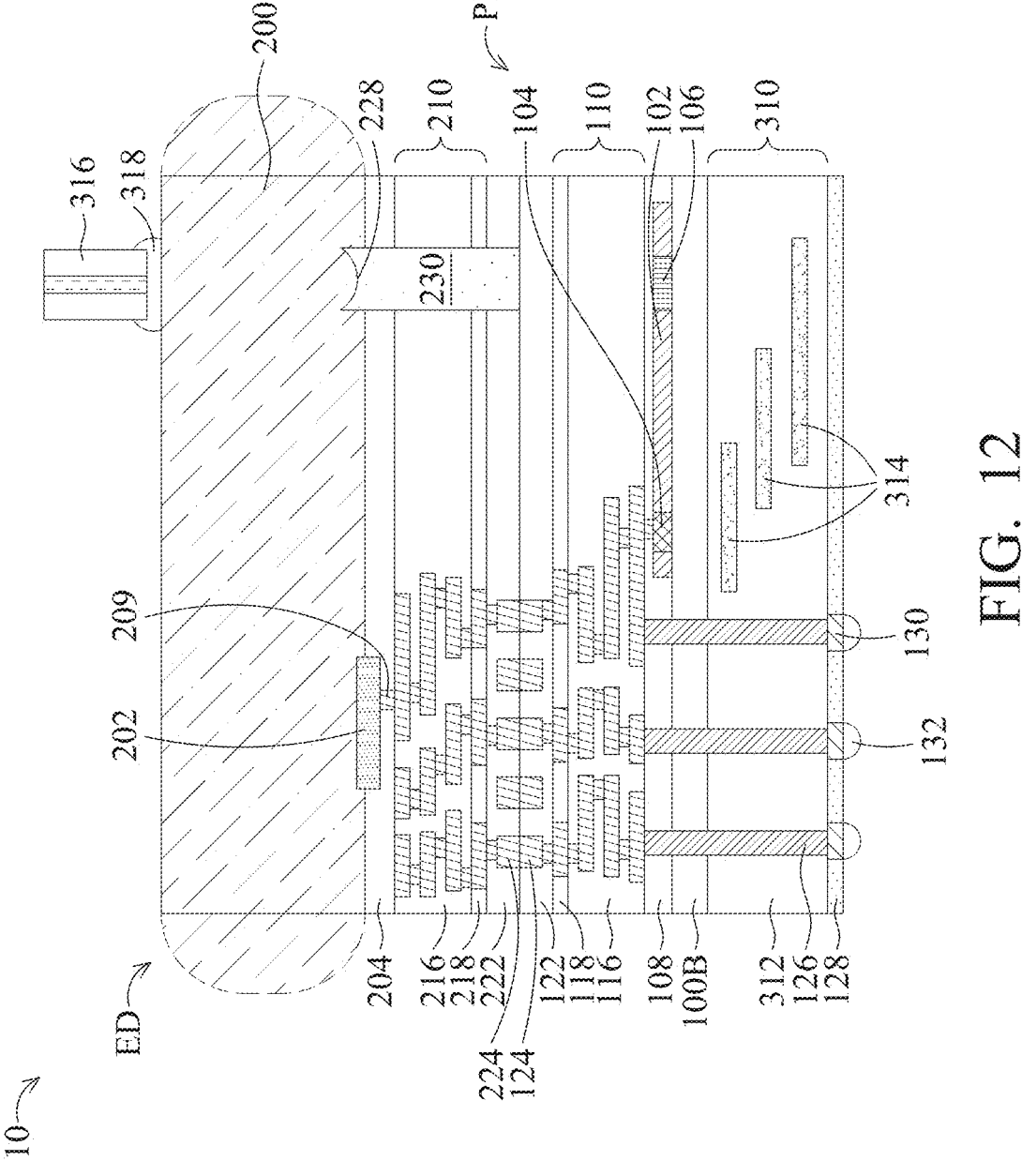

The electronic die ED may include electronic integrated circuits ("EIC") for interfacing with a photonic component 104 (e.g., a photodetector and/or a modulator) of the photonic die PD in the same photonic package 10 (e.g., see FIG. 12). The electronic die ED may include integrated circuits for controlling the operation of the photonic components 104. For example, the electronic die ED may include controllers, drivers, transimpedance amplifiers, the like, or a combination thereof. The electronic die ED may also include a central processing unit (CPU), in some embodiments. In some embodiments, the electronic die ED includes integrated circuits for processing electrical signals received from the photonic component 104 comprising a photodetector. The electronic die ED may control high-frequency signaling of the photonic components 104 according to electrical signals (digital or analog) received from another device or die, in some embodiments. In some embodiments, the electronic die ED provides Serializer/Deserializer (SerDes) functionality. In this manner, the electronic die ED may act as part of an I/O interface between optical signals and electrical signals within the photonic package 10. In some embodiments, the photonic packages 10 described herein could be considered system-on-chip (SoC) or system-on-integrated-circuit (SoIC) devices.

Figure 6:
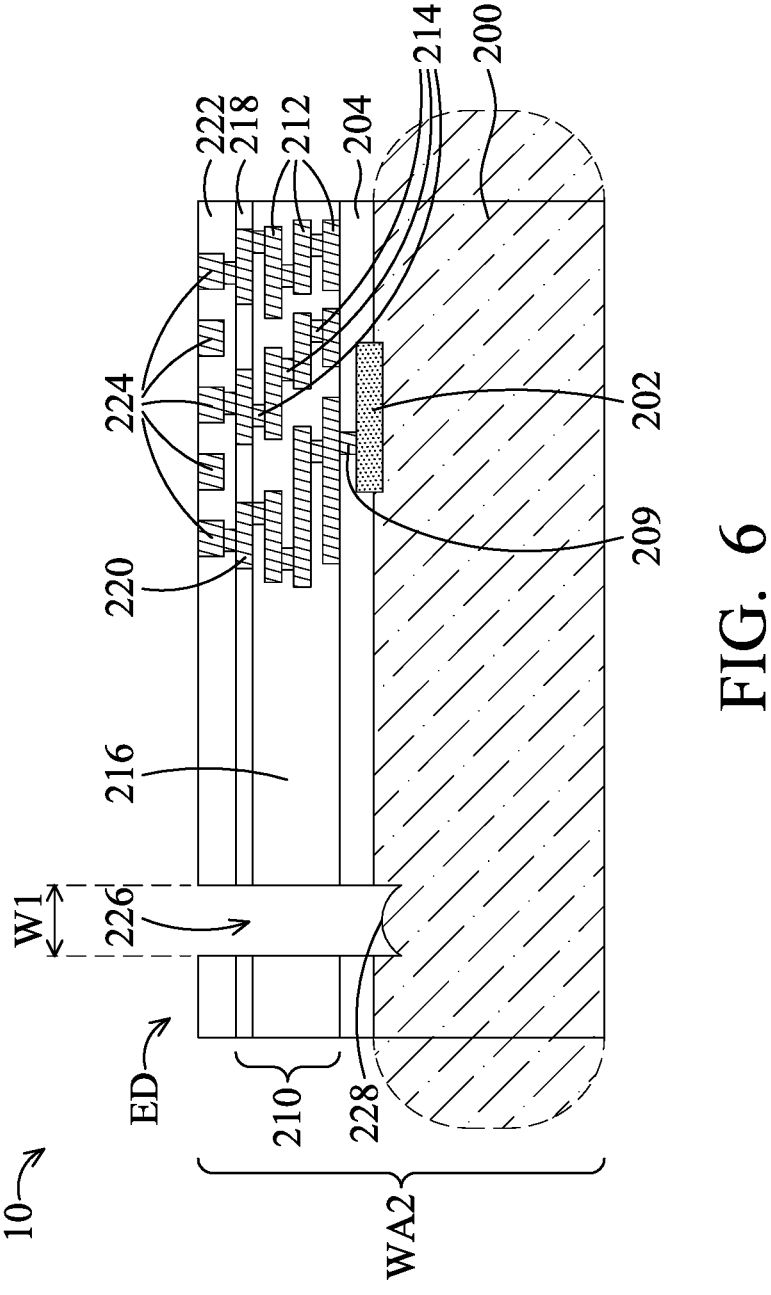

In FIG. 6, micro lenses 228 may be formed in the EIC wafer WA2 prior to the bonding process, in accordance with some embodiments. The micro lens 228 may facilitate improved optical coupling between a grating coupler 106 of the photonic die PD and a vertically-mounted optical fiber 316 (e.g., see FIG. 12). In some embodiments, the micro lenses 228 are formed on the top surface of the substrate 200. Before the micro lenses 228 are formed, openings 226 are first formed in the structure (e.g., including the dielectric layer 204, the redistribution structure 210, and the bond layer 222) overlying the substrate 200 using acceptable photolithography and etching techniques. For example, a photoresist layer (not shown) may be formed on the bond layer 222 and patterned, with the pattern of the photoresist layer corresponding to the openings 226. One or more etching processes may then be performed on the bond layer 222 using the patterned photoresist layer as an etching mask to form the openings 226. The etching processes may include one or more dry etching processes and/or wet etching processes, which may include anisotropic processes. The openings 226 extend through the bond layer 222, the redistribution structure 210, and dielectric layer 204, in some embodiments. The openings 226 may have sidewalls substantially perpendicular to the top surface of the substrate 200 or slightly tilt.

Micro lenses 228 are then formed in the substrate 200 through the openings 226 using an etching process, such as a dry etching process or a wet etching process, in some embodiments. Accordingly, the micro lenses 228 may be vertically aligned with the opening 226, and each micro lens 228 and the corresponding opening 226 may have the same width W1.

Figure 7:
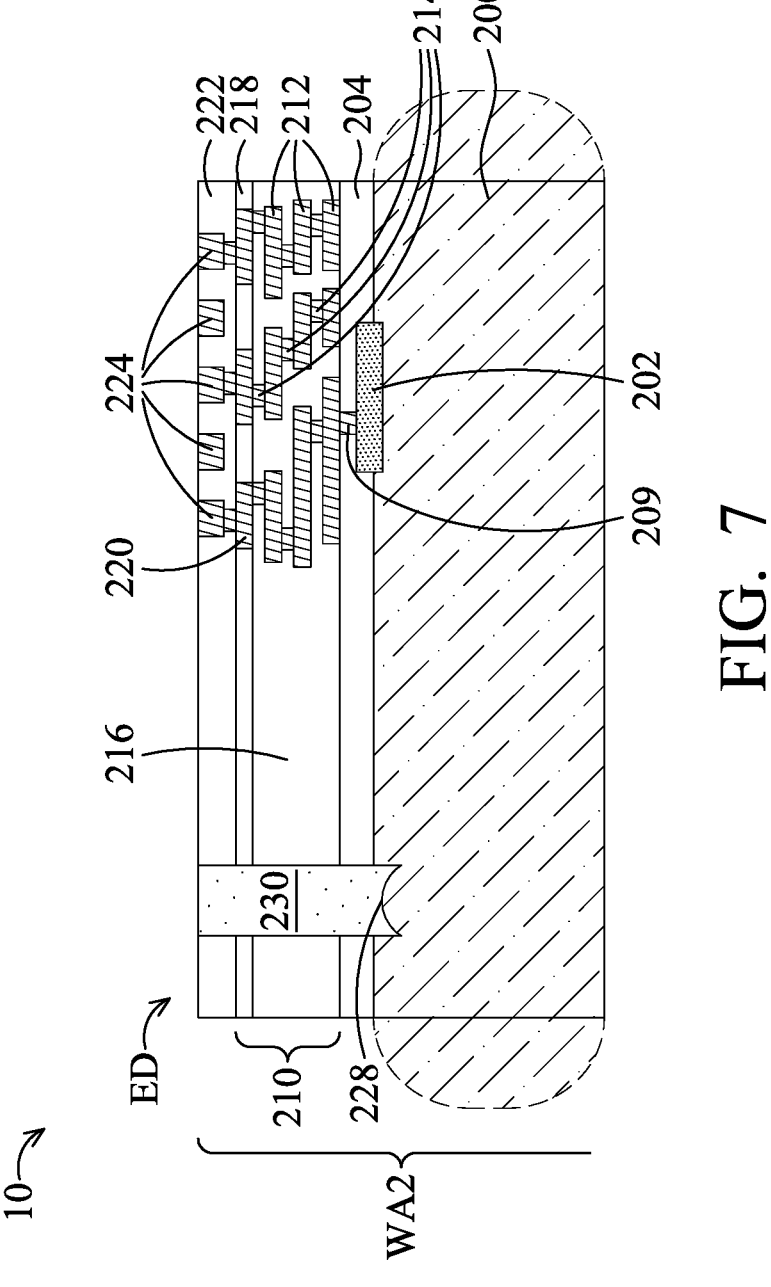

In FIG. 7, optical material fillers 230 are then formed in the openings 226 using any suitable process (e.g., spin coating, CVD, PVD, ALD, the like, or a combination thereof), in accordance with some embodiments. In some embodiments, the optical material fillers 230 further extends into the space between the surfaces of the micro lenses 228 and the top surface of the substrate 200. The optical material fillers 230 may be formed of or comprise, for example, silicon oxide, silicon nitride, a polymer, the like, or a combination thereof. In some embodiments, the optical material filler 230 may be a material (e.g., silicon oxide) that is substantially transparent to light at wavelengths suitable for transmitting optical signals or optical power between optical components (e.g., a grating coupler 106) of the photonic die PD and a vertically-mounted optical fiber 316 (e.g., see FIG. 12). In some embodiments, a planarization process (e.g., a CMP process or the like) may be performed to remove excess optical material fillers 230 along the top surface of the bond layer 222, such that top surfaces of the optical material fillers 230 and the bond layer 222 (and the bond pads 224) are level, which facilitates the subsequent bonding process. The optical material filler 230 may extend from top of the bond layer 222, penetrates through the bond layer 222, the redistribution structure 210, and dielectric layer 204, and extend into the substrate 200 in some embodiments. The micro lenses 228 may be located at the same level with the electronic components 202 in some embodiments.

Figure 8:
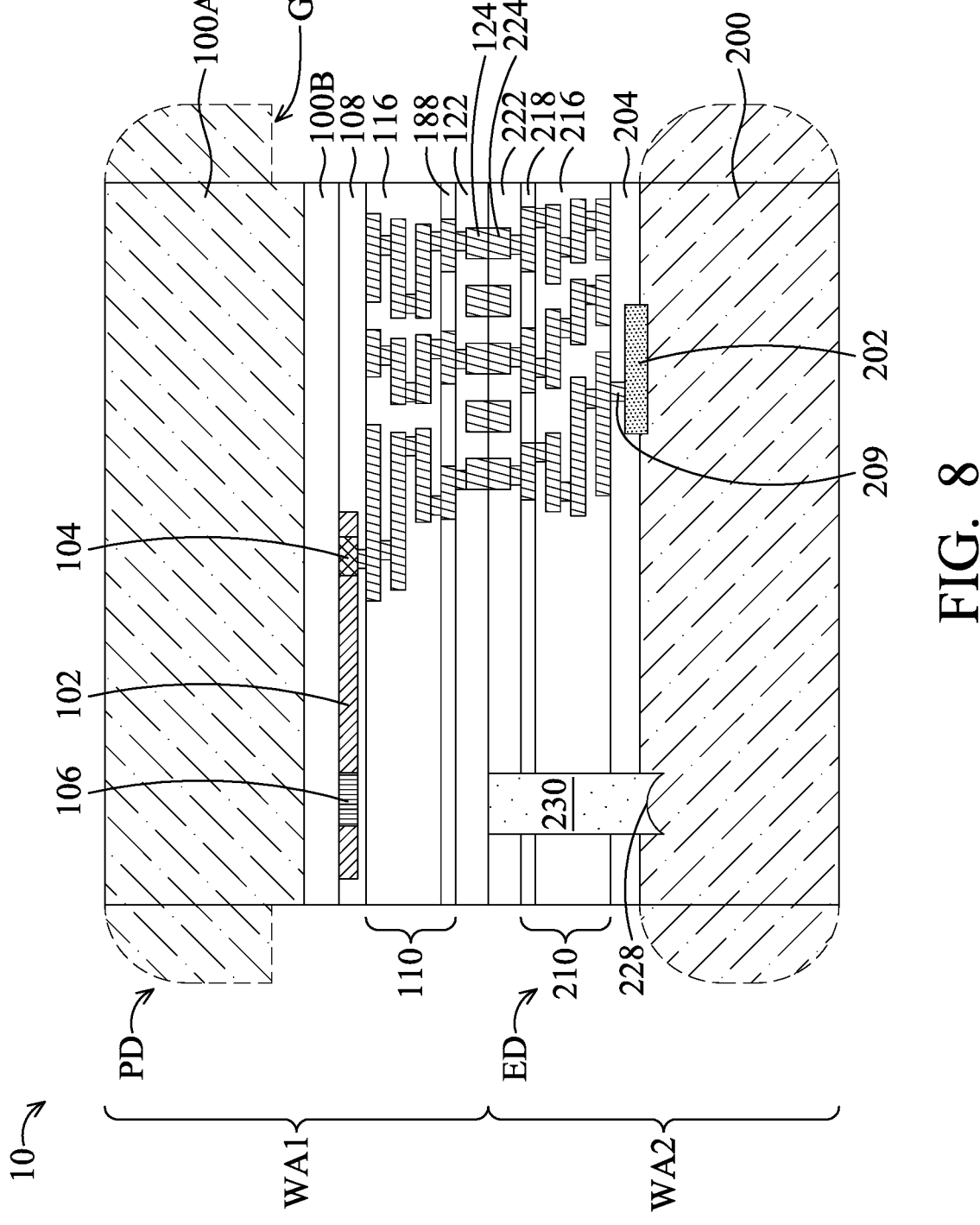

In FIG. 8, the PIC wafer WA1 is flipped over and bonded to the EIC wafer WA2 using hybrid bonding, in accordance with some embodiments. Dielectric-to-dielectric bonding may occur between the bonding layer 122 of the PIC wafer WA1 and the bonding layer 222 of the EIC wafer WA, in some embodiments. During the bonding, metal-to-metal bonding may also occur between the bond pads 124 of the PIC wafer WA1 and the bond pads 224 of the EIC wafer WA2.

In some embodiments, before performing the "wafer-on-wafer (WoW)" bonding process described above, a surface treatment is performed on the PIC wafer WA1 and/or the EIC wafer WA2. In some embodiments, the bonding surfaces of the PIC wafer WA1 and/or the EIC wafer WA2 may first be activated utilizing, for example, a dry treatment, a wet treatment, a plasma treatment, exposure to an inert gas, exposure to $H_2$, exposure to $N_2$, exposure to $O_2$, the like, or a combination thereof. However, any suitable activation process may be utilized. After the activation process, the PIC wafer WA1 and/or the EIC wafer WA2 may be cleaned using, e.g., a chemical rinse. The PIC wafer WA1 is then aligned with the EIC wafer WA2 (i.e., photonic dies PD are aligned with electronic dies ED) and placed into physical contact with the EIC wafer WA2. The PIC wafer WA1 may be placed on the EIC wafer WA2 using a pick-and-place process, for example. The PIC wafer WA1 and the EIC wafer WA2 may then be subjected to a thermal treatment and/or pressed against each other (e.g., by applying contact pressure) to bond the PIC wafer WA1 and the EIC wafer WA2. For example, the PIC wafer WA1 and the EIC wafer WA2 may be subjected to a pressure of about 200 kPa or less, and to a temperature in the range of about 200° C. to about 400° C. The PIC wafer WA1 and the EIC wafer WA2 may then be subjected to a temperature at or above the eutectic point of the material of the bond pads 124 and the bond pads 224 (e.g., a temperature in the range of about 150° C. to about 650° C.) to fuse the bond pads 124 and the bond pads 224. In this manner, the dielectric-to-dielectric bonding and metal-to-metal bonding of the PIC wafer WA1 and the EIC wafer WA2 forms a bonded structure. In some embodiments, the bonded structure is further baked, annealed, pressed, or otherwise treated to strengthen or finalize the bonds. Other suitable WoW bonding processes may also be used in other embodiments.

After the above bonding process is completed, the photonic components 104 of the PIC wafer WA1 and the electronic components 202 of the EIC wafer WA2 are electrically interconnected through the redistribution structures 110 and 210 and the bond pads 124 and 224.

Figure 9:
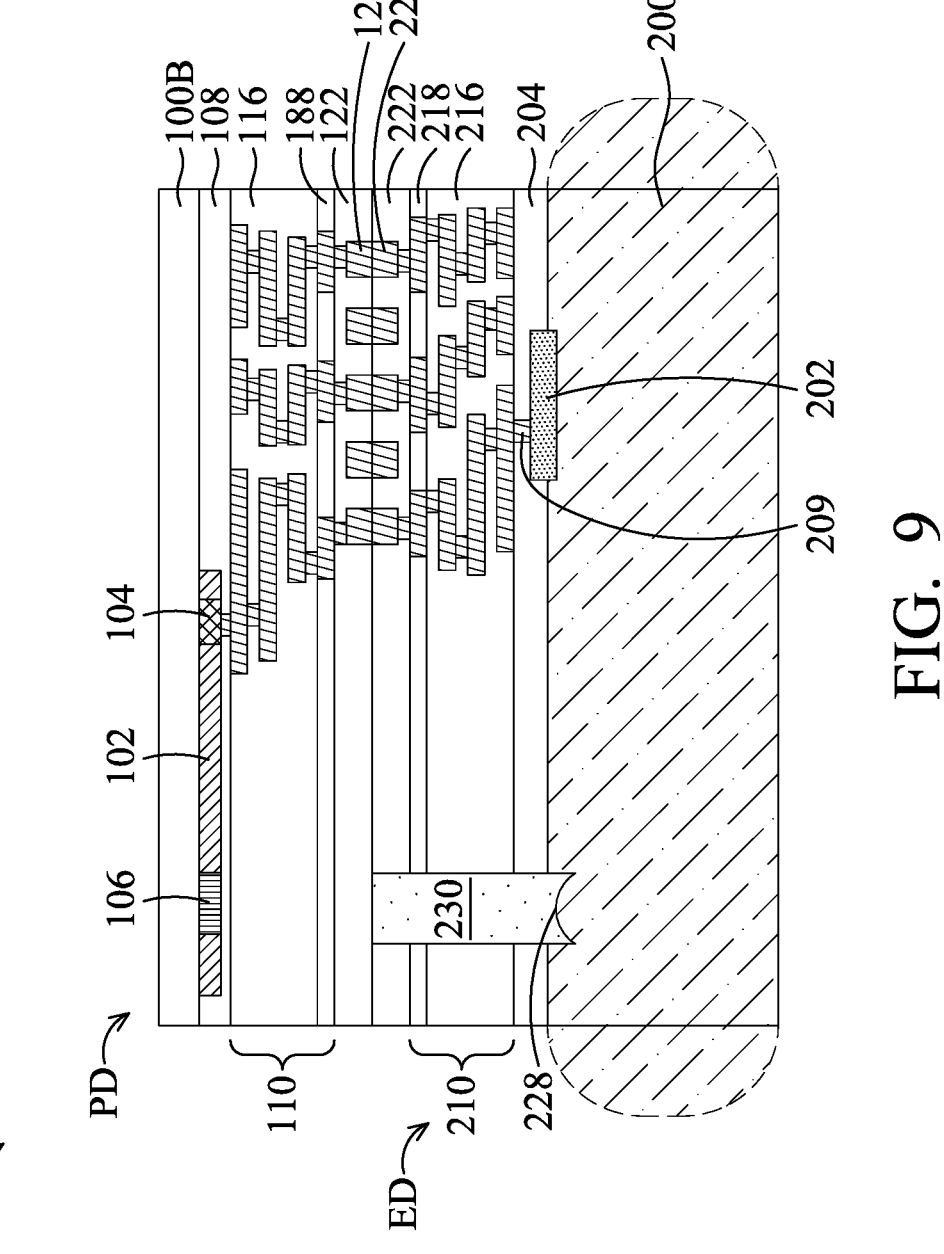

In FIG. 9, the substrate 100A of the PIC wafer WA1 is thinned using a removal process, in accordance with some embodiments. The removal process may include a planarization process (e.g., a CMP or grinding process), an etching process, the like, or a combination thereof. The substrate 100A may be completely removed from the underlying structure, or a portion of the substrate 100A still remains after the removal process, in some embodiments. By providing the groove G (see FIG. 3) at the edge portion of the substrate/wafer 100A (due to the edge trimming process), stress problems that may occur during substrate removal (see FIG. 9) can be reduced or avoided in some embodiments. In some cases, thinning the substrate 100A may improve optical coupling between a waveguide 102 and additional nitride waveguides 314 (see FIG. 10).

In some embodiments, one or more reflectors (not shown) may also be formed in the thinned substrate 100A and adjacent to the grating coupler 106 to reflect light from a vertically-mounted optical fiber 316 (e.g., see FIG. 12) into the grating coupler 106. These and other photonic structures are considered within the scope of the present disclosure.

In FIG. 10, a photonic routing structure 310 is formed over the oxide layer 100B (or the thinned substrate 100A, if present), in accordance with some embodiments. The photonic routing structure 310 includes one or more dielectric layers (collectively shown and referred to as "dielectric layers 312") and includes silicon nitride waveguides 314 formed in the dielectric layers 312. The silicon nitride waveguides 314 provide additional optical signal routing and may be optically coupled to the waveguide 102, in some embodiments.

In some cases, a waveguide formed from silicon nitride (e.g., nitride waveguides 314) may have advantages over a waveguide formed from silicon (e.g., waveguides 102). For example, silicon nitride has a higher dielectric constant than silicon, and thus a nitride waveguide may have a greater internal confinement of light than a silicon waveguide. This may also allow the performance or leakage of nitride waveguides to be less sensitive to process variations, less sensitive to dimensional uniformity, and less sensitive to surface roughness (e.g., edge roughness or linewidth roughness).

In some embodiments, a nitride waveguide 314 may be formed, for example, by depositing a layer of silicon nitride and then patterning the layer of silicon nitride to form the nitride waveguide 314. The silicon nitride layer may be formed using a suitable deposition technique, such as CVD, PECVD, LPCVD, PVD, or the like. The layer of silicon nitride may be patterned using acceptable photolithography and etching techniques, similar to those described above for forming the silicon waveguides 102.

Figure 11:
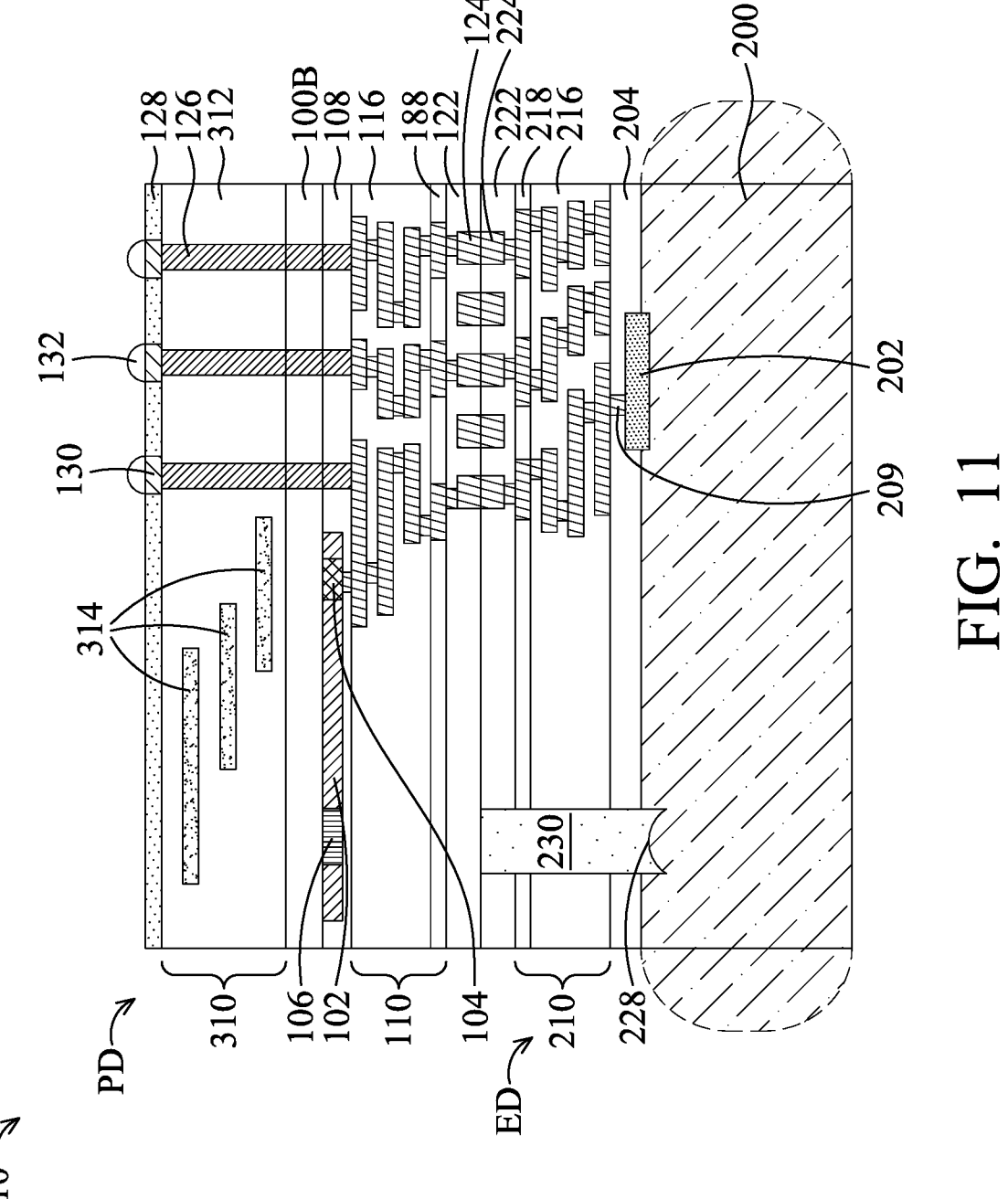

In FIG. 11, vias 126 are formed to extend through the dielectric layers 312, the thinned substrate 100A (if present), the oxide layer 100B, and the dielectric layer 108 to physically and electrically contact the conductive features 112/114 of the redistribution structure 110, in accordance with some embodiments. The vias 126 may be formed using techniques and materials similar to those described above for forming the conductive features 112/114.

Conductive connectors 132 are then formed on the vias 126, in accordance with some embodiments. The conductive connectors 132 may be used to electrically connect the photonic package 10 to an external structure such as a package substrate, an interposer, or the like. In some embodiments, an optional passivation layer 128 is formed over the dielectric layers 312. The passivation layer 128 may comprise, for example, a polymer such as polybenzoxazole (PBO), polyimide, benzocyclobutene (BCB), or the like, and may be formed by spin coating, lamination, CVD, PVD, ALD, or the like. In some embodiments, under-bump metallizations (UBMs) 130 may be formed within the passivation layer 128 to make physical and electrical contact to the vias 126. The UBMs 130 may be formed of one or more suitable conductive materials using a suitable process, such as plating. The conductive connectors 132 are then formed on the UBMs 130 using a suitable process, such as plating, printing, solder transfer, ball placement, or the like, in accordance with some embodiments. The conductive connectors 132 may be, for example, ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 132 may include a conductive material such as solder, copper, aluminum, gold, nickel, silver, palladium, tin, the like, or a combination thereof.

In FIG. 12, the resulting package structure shown in FIG. 11 is flipped over and attached to a temporary carrier (e.g., a glass carrier, a ceramic carrier, or the like, not shown), in accordance with some embodiments. In some embodiments, a singulation process is then performed by, for example, sawing along scribed lines (not shown) of the package structure to separate the multiple photonic packages within the package structure into individual photonic packages 10. One of the photonic package 10 is shown in FIG. 12, including a photonic die PD bonded to an electronic die ED, wherein sidewalls of the photonic die PD and electronic die ED are contiguous (e.g., vertically aligned with each other), i.e., the photonic die PD and the electronic die ED have the same dimension (width). One or more micro lenses 228 are embedded in the electronic die ED (e.g., formed on the inner surface of the substrate 200 of the electronic die ED facing the photonic die PD) and spaced apart from the sidewall of the electronic die ED. Similarly, the optical material fillers 230 corresponding to the micro lenses 228 are also spaced apart from the sidewall of the electronic die ED.

FIG. 12 also illustrates that one or more optical fibers 316 (only one optical fiber 316 is shown) are attached to the outer wall of the photonic package 10. The optical fibers 316 may be coupled to (e.g., mounted on) the outer surface of the substrate 200 of the electronic die ED by optical glue 318, and are optically coupled to the grating coupler 106 through the micro lenses 228 to support optical communication between the photonic package 10 and an external device. Although not shown, in a plan view, the optical fibers 316 and the micro lenses 228 may have corresponding and identical arrangements. For example, the optical fibers 316 may be arranged in an array of multiple rows and columns, and the micro lenses 228 may be arranged in an array of multiple rows and columns accordingly.

Although in the above embodiments the micro lenses 228 are formed after the redistribution structure 210 and the bond layer 222 are formed, the embodiments of the present disclosure are not limited thereto. For example, the micro lenses 228 may also be formed before or during the formation of the redistribution structure 210, in other embodiments (e.g., see FIGS. 13 to 14 and FIGS. 15 to 16).

Figure 13:
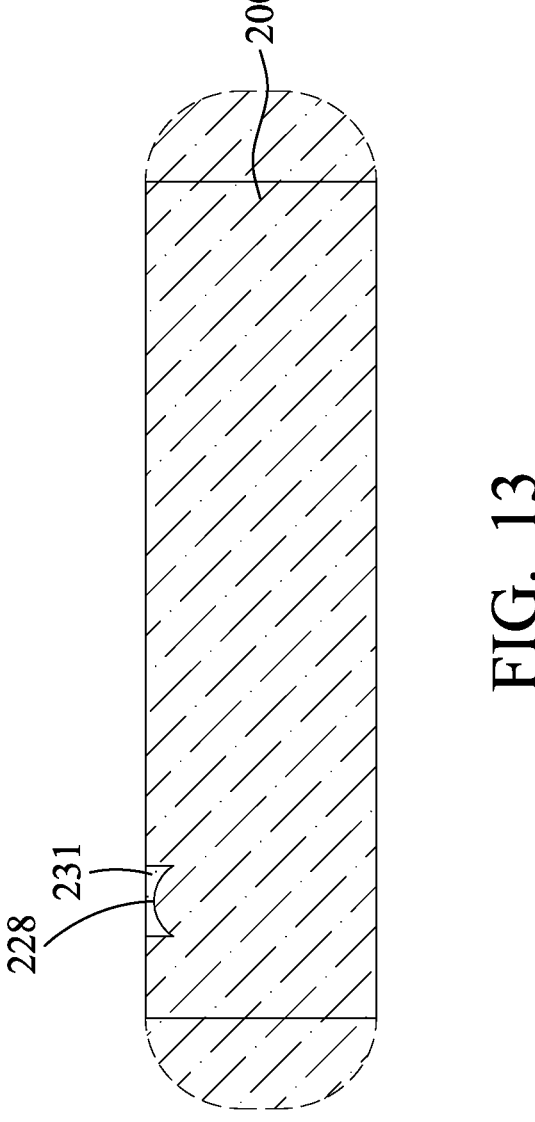
FIGS. 13 to 14 illustrate cross-sectional views of intermediate stages in the formation of an electronic integrated circuit (EIC) wafer with embedded micro lenses, in accordance with some embodiments.
Figure 14:
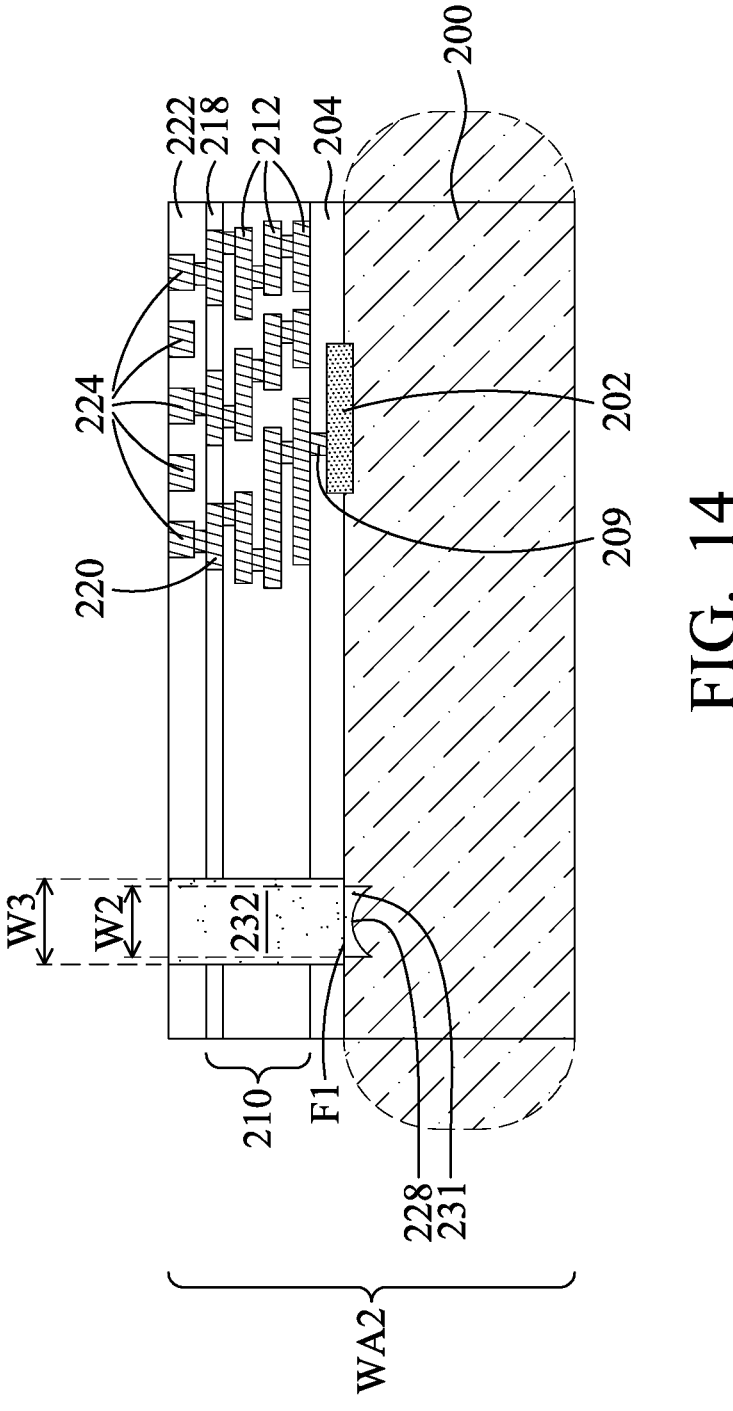

FIGS. 13 to 14 illustrate cross-sectional views of intermediate stages in the formation of an EIC wafer WA2 with embedded micro lenses 228, in accordance with some embodiments. The formation steps of the EIC wafer WA2 shown in FIGS. 13 to 14 are similar to the formation steps of the EIC wafer WA2 shown in FIGS. 4 to 7 except for the timing of forming the micro lenses 228, so only the differences are described here.

In FIG. 13, a substrate 200 is provided, and one or more micro lenses 228 are formed on the top surface of the substrate 200 prior to forming the electronic components 202 (see FIG. 14) using acceptable photolithography and etching techniques, in accordance with some embodiments. For example, a photoresist layer may be formed over the substrate 200 and patterned, with the pattern of the photoresist layer corresponding to the micro lenses 228. An etching process may then be performed on the substrate 200 using the patterned photoresist layer as an etching mask to form the micro lenses 228. The etching processes may be a dry etching process or a wet etching process. Optical material fillers 231 (similar to the optical material fillers 230) are then formed (e.g., filled) in the space between the surfaces of the micro lenses 228 and the top surface of the substrate 200 using a technique similar to those described above for the optical material fillers 230 or using a different technique. In some embodiments, a planarization process (e.g., a CMP process or the like) may be performed to remove excess optical material fillers 231 along the top surface of the substrate 200, such that top surfaces of the optical material fillers 231 and the substrate 200 are level, which facilitates subsequent processes.

In FIG. 14, similar fabrication processes as shown in FIGS. 4 to 5 are performed to form the electronic components 202 on the top surface of the substrate 200, and form the dielectric layer 204, the redistribution structure 210, and the bond layer 222 sequentially over the substrate 200 and the electronic components 202, in accordance with some embodiments. Openings (not shown) are then formed through the structure (e.g., including the dielectric layer 204, the redistribution structure 210, and the bond layer 222) overlying the substrate 200 using a technique similar to those described above for the openings 226 or using a different technique. Optical material fillers 232 (similar to the optical material fillers 230) are then formed (e.g., filled) in the openings using a technique similar to those described above for the optical material fillers 230 or using a different technique. The material of optical material fillers 231 and 232 may be the same as each other or different from each other. In some embodiments, a planarization process (e.g., a CMP process or the like) may be performed to remove excess optical material fillers 232 along the top surface of the bond layer 222, such that top surfaces of the optical material fillers 232 and the bond layer 222 (and the bond pads 224) are level, which facilitates the subsequent bonding process.

Using the above fabrication method, there may be a distinguishable interface F1 between the optical material fillers 231 and 232 because they are formed separately. In some embodiments, the width W3 of the optical material filler 232 may be equal to or greater than the width W2 of the optical material filler 231 (i.e., the width of the micro lens 228).

Figure 15:
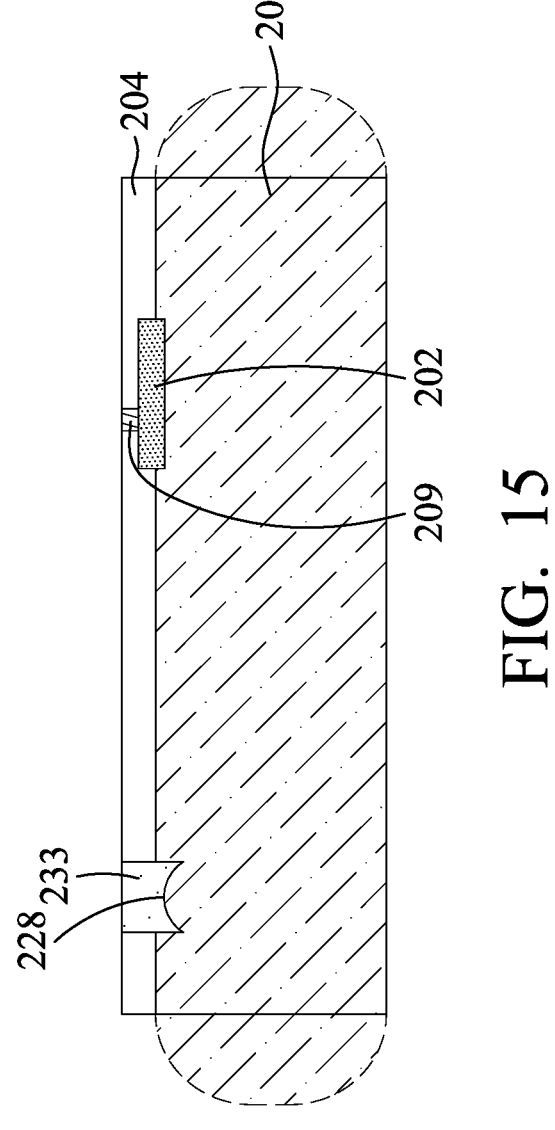
FIGS. 15 to 16 illustrate cross-sectional views of intermediate stages in the formation of an EIC wafer with embedded micro lenses, in accordance with some embodiments.
Figure 16:
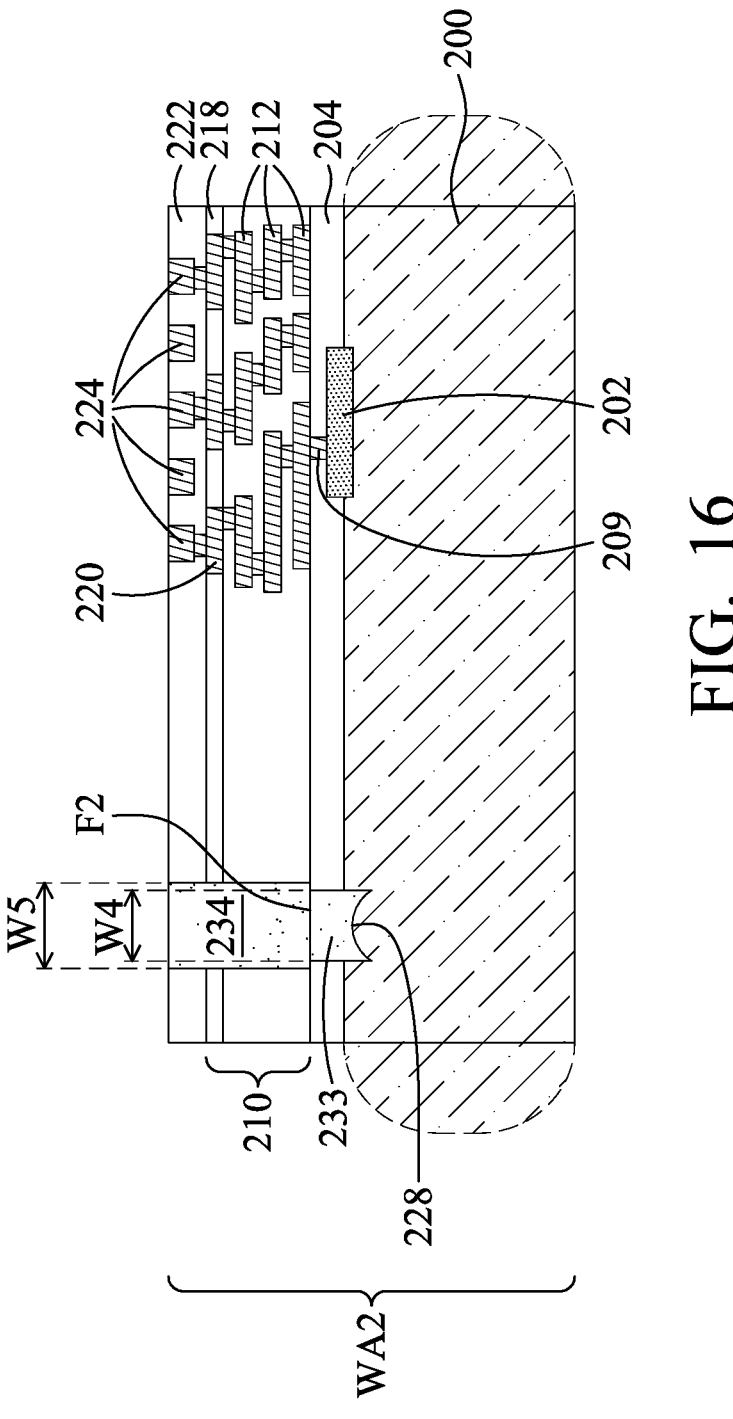

FIGS. 15 to 16 illustrate cross-sectional views of intermediate stages in the formation of an EIC wafer WA2 with embedded micro lenses 228, in accordance with some embodiments. The formation steps of the EIC wafer WA2 shown in FIGS. 15 to 16 are similar to the formation steps of the EIC wafer WA2 shown in FIGS. 4 to 7 except for the timing of forming the micro lenses 228, so only the differences are described here.

In FIG. 15, a structure similar to that shown in FIG. 4 is obtained, and one or more micro lenses 228 are formed on the top surface of the substrate 200 prior to forming the redistribution structure 210 (see FIG. 16) using acceptable photolithography and etching techniques, in accordance with some embodiments. For example, before the micro lenses 228 are formed, openings (not shown) are first formed in the dielectric layer 204 overlying the substrate 200 using a technique similar to those described above for the openings 226 or using a different technique. The openings extend through the dielectric layer 204, and may have sidewalls substantially perpendicular to the top surface of the substrate 200, in some embodiments. In some embodiments, the micro lenses 228 are then formed in the substrate 200 through the openings of the dielectric layer 204 using an etching process, such as a dry etching process or a wet etching process.

Optical material fillers 233 (similar to the optical material fillers 230) are then formed (e.g., filled) in the openings of the dielectric layer 204 using a technique similar to those described above for the optical material fillers 230 or using a different technique. In some embodiments, the optical material fillers 233 further extend into the space between the surfaces of the micro lenses 228 and the top surface of the substrate 200. In some embodiments, a planarization process (e.g., a CMP process or the like) may be performed to remove excess optical material fillers 233 along the top surface of the dielectric layer 204, such that top surfaces of the optical material fillers 233 and the dielectric layer 204 are level, which facilitates subsequent processes.

In FIG. 16, similar fabrication processes as shown in FIG. 5 are performed to form the redistribution structure 210 and the bond layer 222 sequentially over the substrate 200 and the electronic components 202, in accordance with some embodiments. Openings (not shown) are then formed through the structure (e.g., including the redistribution structure 210 and the bond layer 222) overlying the substrate 200 using a technique similar to those described above for the openings 226 or using a different technique. Optical material fillers 234 (similar to the optical material fillers 230) are then formed (e.g., filled) in the openings using a technique similar to those described above for the optical material fillers 230 or using a different technique. The material of optical material fillers 233 and 234 may be the same as each other or different from each other. In some embodiments, a planarization process (e.g., a CMP process or the like) may be performed to remove excess optical material fillers 234 along the top surface of the bond layer 222, such that top surfaces of the optical material fillers 234 and the bond layer 222 (and the bond pads 224) are level, which facilitates the subsequent bonding process.

Using the above fabrication method, there may be a distinguishable interface F2 between the optical material fillers 233 and 234 because they are formed separately. In some embodiments, the width W5 of the optical material filler 234 may be equal to or greater than the width W4 of the optical material filler 233 (i.e., the width of the micro lens 228).

In some embodiments, after obtaining the EIC wafer WA2 shown in FIG. 14 or 16, similar fabrication processes as shown in FIGS. 8 to 12 are performed to complete the formation of the photonic package 10.

Figure 17:
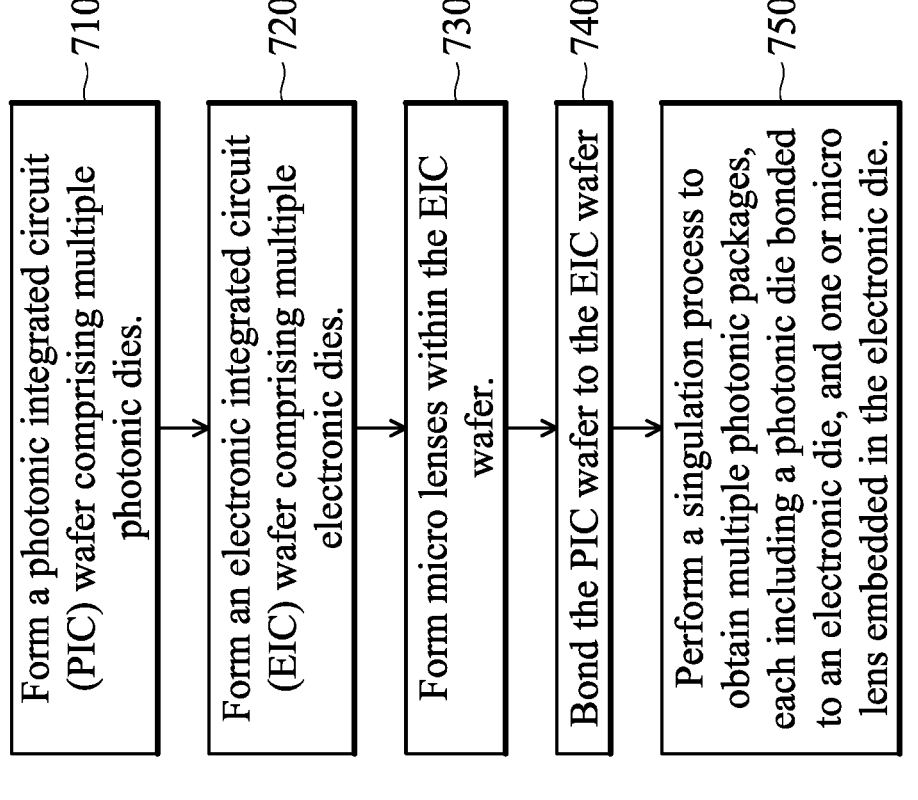
FIG. 17 illustrates a flowchart of a method for forming a photonic package, in accordance with some embodiments.

FIG. 17 illustrates a flowchart of a method 700 for forming a photonic package (e.g., photonic package 10), in accordance with some embodiments. In step 710, a PIC wafer WA1 is formed, which includes multiple photonic dies PD. In step 720, an EIC wafer WA2 is formed, which includes multiple electronic dies ED. In step 730, micro lenses 228 are formed within the EIC wafer WA2. In step 740, the PIC wafer WA1 is bonded to the EIC wafer WA2 using, for example, WoW bonding process (e.g., hybrid bonding). In step 750, a singulation process is performed to obtain multiple photonic packages from the bonded structure, wherein each photonic package includes a photonic die bonded to an electronic die, and one or more micro lens embedded in the electronic die.

Embodiments of the present disclosure may achieve advantages. Micro lenses are formed directly within the EIC wafer, so no an additional wafer or support is required to form the micro lens. Also, photonic packages can be formed in only one-step WoW bonding process, eliminating the need for an additional bonding process (e.g., chip-on-wafer (CoW) bonding process that requires more manufacturing steps, which can cause processes issues). Accordingly, the process flow is simplified, manufacturing time and cost are reduced, and product reliability can be improved.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

In accordance with some embodiments, a method of forming a semiconductor package is provided. The method includes forming a first wafer that includes a plurality of photonic dies. The method includes forming a second wafer that includes a plurality of electronic dies. The method includes forming micro lenses within the second wafer. The method includes bonding the first wafer to the second wafer after forming the micro lenses. The method further includes performing a singulation process to dice the first wafer and the second wafer to form a plurality of photonic packages. Each photonic package includes an electronic die, a photonic die bonded to the electronic die, and one or more micro lenses embedded in the electronic die.

In accordance with some embodiments, a method of forming a semiconductor package is provided. The method includes forming a first wafer that includes a plurality of photonic dies. Each photonic die includes a first substrate, a grating coupler formed over the top surface of the first substrate, and first dielectric layers formed over the grating coupler. The method includes forming a second wafer that includes a plurality of electronic dies. Each electronic die includes a second substrate, an electronic component formed on the top surface of the second substrate, and second dielectric layers formed over the electronic component. The method includes forming micro lenses directly on the top surface of the second substrate. The method includes forming openings in the second dielectric layers, wherein the openings are aligned with the micro lenses. The method includes filling the openings with optical material fillers. The method includes bonding the first wafer to the second wafer after forming the micro lenses and the optical material fillers. The method further includes performing a singulation process to dice the first wafer and the second wafer to form a plurality of photonic packages. Each photonic package includes an electronic die, a photonic die bonded to the electronic die, and a micro lens and corresponding optical material filler embedded in the electronic die, wherein the micro lens is aligned with the grating coupler.

In accordance with some embodiments, a semiconductor package is provided. The semiconductor package includes a photonic die and an electronic die. The photonic die includes a first redistribution structure, an optical layer, and a first bond layer. The optical layer is formed over a first side of the first redistribution structure, wherein the optical layer includes a grating coupler. The first bond layer is formed over a second side of the first redistribution structure opposite to the first side of the first redistribution structure. The electronic die includes a substrate, an electronic component, a second redistribution structure, a second bond layer, a micro lens, and an optical material filler. The electronic component is formed on the top surface of the substrate. The second redistribution structure is formed over the top surface of the substrate and the electronic component. The second bond layer is formed over the second redistribution structure and in direct contact with the first bond layer of the photonic die. The micro lens is formed directly on the top surface of the substrate and aligned with the grating coupler. The optical material filler is formed over the top surface of the substrate, extends through the second bond layer and the second redistribution structure, and is aligned with the micro lens.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a semiconductor package, comprising:

forming a first wafer, wherein the first wafer comprises a plurality of photonic dies;

forming a second wafer, wherein the second wafer comprises a plurality of electronic dies, wherein forming the second wafer comprises:

forming electronic components on a top surface of a substrate;

forming micro lenses within the second wafer, wherein the micro lenses are formed on the top surface of the substrate and located at the same level as the electronic components;

bonding the first wafer to the second wafer after forming the micro lenses; and performing a singulation process to dice the first wafer and the second wafer to form a plurality of photonic packages, wherein a photonic package of the plurality of photonic packages comprises an electronic die, a photonic die bonded to the electronic die, and one or more micro lenses embedded in the electronic die.

2. The method as claimed in claim 1, wherein forming the second wafer further comprises:

forming a dielectric layer over the top surface of the substrate and the electronic components;

forming a redistribution structure over the dielectric layer, wherein the redistribution structure is electrically connected to the electronic components; and forming a bond layer over the redistribution structure, wherein the bond layer is configured to bond the second wafer and the first wafer.

3. The method as claimed in claim 2, wherein forming the micro lenses comprises:

after forming the bond layer, forming openings that extend through the bond layer, the redistribution structure, and the dielectric layer; and forming the micro lenses on the top surface of the substrate through the openings using an etching process.

4. The method as claimed in claim 3, further comprising:

filling the openings with optical material fillers, wherein the optical material fillers further extend into a space between the micro lenses and the top surface of the substrate; and performing a planarization process to remove excess portions of the optical material fillers along a top surface of the bond layer.

5. The method as claimed in claim 2, wherein the micro lenses are formed the top surface of the substrate using an etching process prior to forming the electronic components.

6. The method as claimed in claim 5, further comprising:

filling first optical material fillers into a space between the micro lenses and the top surface of the substrate; and performing a planarization process to remove excess portions of the first optical material fillers along the top surface of the substrate, and wherein after the planarization process, the electronic components, the dielectric layer, the redistribution structure, and the bond layer are formed sequentially.

7. The method as claimed in claim 6, further comprising:

after forming the bond layer, forming openings that extend through the bond layer, the redistribution structure, and the dielectric layer, wherein the openings are aligned with the micro lenses;

filling the openings with second optical materials fillers; and performing a planarization process to remove excess portions of the second optical material fillers along a top surface of the bond layer.

8. The method as claimed in claim 2, wherein forming the micro lenses comprises:

after forming the electronic components and the dielectric layer and before forming the redistribution structure, forming first openings that extend through the dielectric layer; and forming the micro lenses on the top surface of the substrate through the first openings using an etching process.

9. The method as claimed in claim 8, further comprising:

filling the first openings with first optical material fillers, wherein the first optical material fillers further extend into a space between the micro lenses and the top surface of the substrate; and performing a planarization process to remove excess portions of the first optical material fillers along a top surface of the dielectric layer, and wherein after the planarization process, the redistribution structure and the bond layer are formed sequentially.

10. The method as claimed in claim 9, further comprising:

after forming the bond layer, forming second openings that extend through the bond layer and the redistribution structure, wherein the second openings are aligned with the micro lenses;

filling the second openings with second optical material fillers; and performing a planarization process to remove excess portions of the second optical material fillers along a top surface of the bond layer.

11. A method of forming a semiconductor package, comprising:

forming a first wafer, wherein the first wafer comprises a plurality of photonic dies, each photonic die comprising a first substrate, a grating coupler over a top surface of the first substrate, and first dielectric layers over the grating coupler;

forming a second wafer, wherein the second wafer comprises a plurality of electronic dies, each electronic die comprising a second substrate, an electronic component on a top surface of the second substrate, and second dielectric layers over the electronic component;

forming micro lenses directly on the top surface of the second substrate;

forming openings in the second dielectric layers, wherein the openings are aligned with the micro lenses;

filling the openings with optical material fillers;

bonding the first wafer to the second wafer after forming the micro lenses and the optical material fillers; and performing a singulation process to dice the first wafer and the second wafer to form a plurality of photonic packages, wherein a photonic package of the plurality of photonic packages comprises an electronic die, a photonic die bonded to the electronic die, and a micro lens and corresponding optical material filler embedded in the electronic die, wherein the micro lens is aligned with the grating coupler.

12. The method as claimed in claim 11, wherein the optical material fillers further extend into a space between the micro lenses and the top surface of the substrate.

13. The method as claimed in claim 11, wherein the optical material filler is spaced apart from a sidewall of the photonic package by the second dielectric layers.

14. The method as claimed in claim 11, wherein the micro lenses are formed before forming the openings.

15. The method as claimed in claim 11, wherein the micro lenses are formed after forming the openings.

16. The method as claimed in claim 11, further comprising:

performing a planarization process to remove excess portions of the optical material fillers along a top surface of a topmost second dielectric layer of the second dielectric layers before bonding the first wafer.

17. The method as claimed in claim 11, wherein first bond pads are formed in and exposed from a topmost first dielectric layer of the first dielectric layers, and second bond pads are formed in and exposed from a topmost second dielectric layer of the second dielectric layers, and wherein the first wafer is bonded to the second wafer by dielectric-to-dielectric bonding of the topmost first dielectric layer and the topmost second dielectric layer and metal-to-metal bonding of the first bond pads and the second bond pads.

18. A semiconductor package, comprising:

a photonic die, comprising:

a first redistribution structure;

an optical layer over a first side of the first redistribution structure, wherein the optical layer comprises a grating coupler; and a first bond layer over a second side of the first redistribution structure opposite to the first side of the first redistribution structure; and an electronic die, comprising:

an active component;

a second redistribution structure over the active component;

a second bond layer over the second redistribution structure and in direct contact with the first bond layer of the photonic die;

a micro lens aside the active component and aligned with the grating coupler; and an optical material filler over the micro lens, extending through the second bond layer and the second redistribution structure, and aligned with the micro lens.

19. The semiconductor package as claimed in claim 18, wherein the optical material filler is spaced apart from a sidewall of the semiconductor package.

20. The semiconductor package as claimed in claim 18, wherein a width of the optical material filler is equal to or greater than a width of the micro lens.

*     *     *     *     *